United States Patent [19]

Traversari et al.

[11] 4,289,322

[45] Sep. 15, 1981

[54] GLAND PACK FOR RECIPROCATING MACHINES OPERATING AT HIGH PRESSURE

[75] Inventors: Alessandro Traversari; Enzo Giacomelli, both of Florence, Italy

[73] Assignee: Nuovo Pignone S.p.A., Florence, Italy

[21] Appl. No.: 144,174

[22] Filed: Apr. 25, 1980

[30] Foreign Application Priority Data

Sep. 25, 1979 [IT] Italy .............................. 26005 A/79

[51] Int. Cl.³ .................... F16J 15/28; F16J 15/48
[52] U.S. Cl. ............................. 277/188 A; 92/168; 277/193
[58] Field of Search ................ 92/168, 155; 277/193, 277/188 A, 3

[56] References Cited

U.S. PATENT DOCUMENTS

| | | | |
|---|---|---|---|
| 2,202,802 | 5/1940 | Mason | 277/193 |
| 2,733,969 | 2/1956 | Polk | 277/188 A |
| 2,749,193 | 6/1956 | Traub | 277/188 A |
| 2,889,108 | 6/1959 | Alderson | 92/165 |
| 3,930,657 | 1/1976 | Suensson | 277/188 A |
| 3,940,151 | 2/1976 | Phillips | 92/165 R |
| 4,093,239 | 6/1978 | Sugahara | 92/168 |
| 4,192,519 | 3/1980 | Buggele | 277/188 A |
| 4,211,151 | 7/1980 | Wallischeck | 92/165 R |

Primary Examiner—Robert I. Smith

Attorney, Agent, or Firm—Morgan, Finnegan, Pine, Foley & Lee

[57] ABSTRACT

A gland pack for reciprocating plunger machines operating at high pressure, comprising three-element seal assemblies housed in cavities at the head end of the pack, each element comprising a seal ring constructed of a self-lubricating plastics material and in the form of a number of pseudotangentially cut segments held together by a circumferential spring, which is coaxially sandwiched between two metal anti-extrusion rings which, when subjected to the high differential pressure of the working fluid, reduce their diameter until they approach the outer surface of the plunger but without ever pressing against it, the first metal anti-extrusion ring, which is situated at the head end of the cavity, being provided with radial grooves in its flat surface on the head side, whereas in the cavities at the crank mechanism end of the gland pack there are housed two-element seal assemblies, each element comprising a seal ring constructed of self-lubricating plastics material and in the form of a number of pseudotangentially cut segments held together by a circumferential spring and provided with radial grooves in its flat surface on the head side, and a metal anti-extrusion ring which, when subjected to the differential pressure of the working fluid, reduces its diameter until it approaches the outer surface of the plunger but without ever pushing against it; said metal anti-extrusion rings can also be in the form of a whole ring or in the form of radially cut segments held together by a circumferential spring.

13 Claims, 7 Drawing Figures

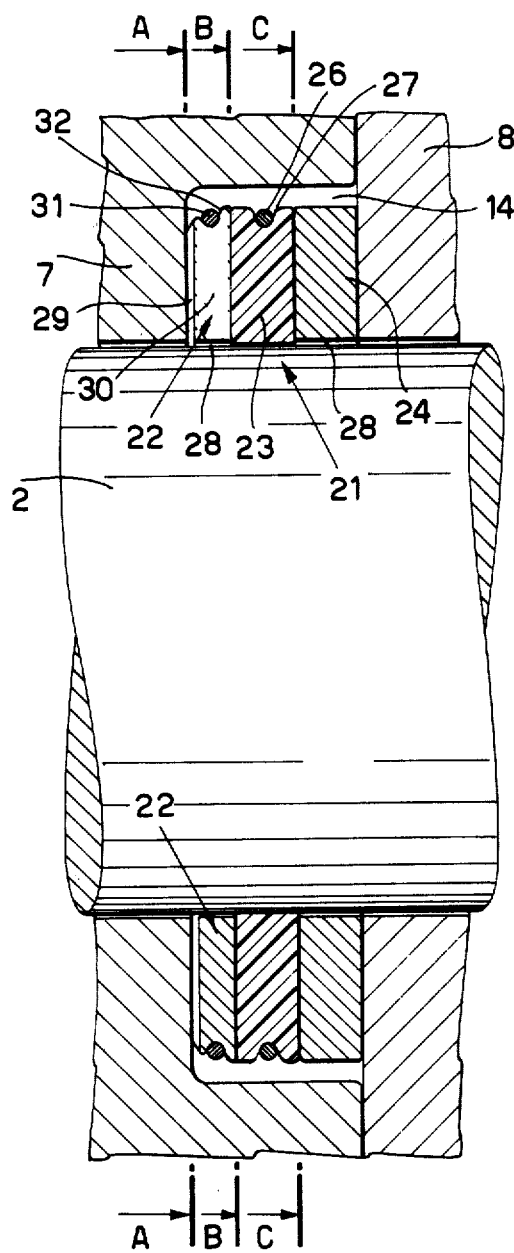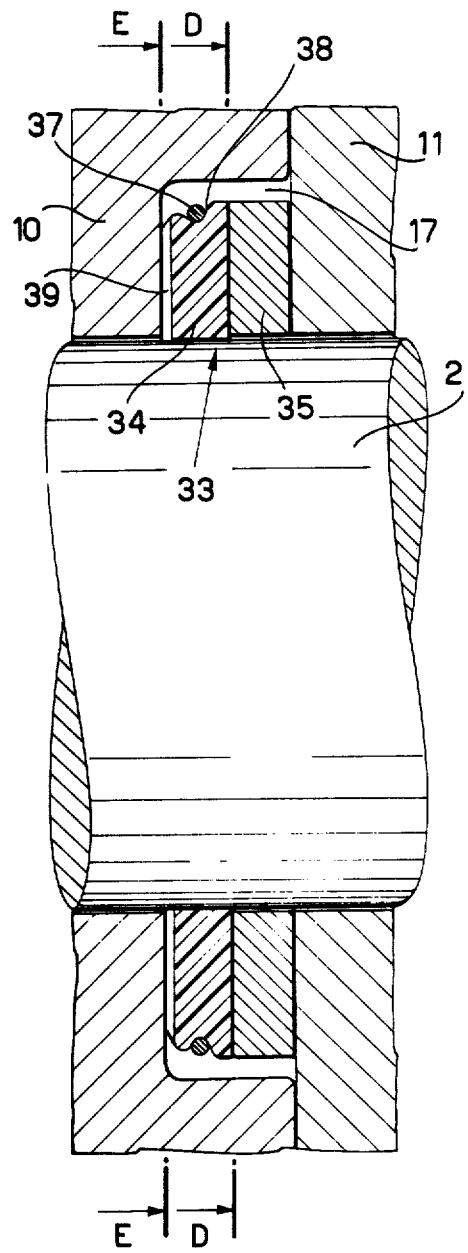

GLAND PACK FOR RECIPROCATING MACHINES OPERATING AT HIGH PRESSURE

This invention relates to a new gland pack for reciprocating machines operating at high pressure, which besides providing a long-life effective seal during compression and excellent behaviour with regard to backflow during suction, allows the necessary quantity of lubricating oil fed to the seal elements to be drastically reduced, and to use lubricating oils of low lubricity, and also allows the use of piston rods or plungers of any material.

In reciprocating machines, whether these be compressors, pumps, engines or expansion engines, one of the most important problems to solve is the problem of sealing against fluid leakages along the member which transmits the reciprocating motion to the piston, and which hereinafter will be indicated generally by the term "plunger", whether referring to a piston rod or an actual plunger. This seal is generally formed, especially at the more substantial pressures, by means of a gland pack consisting substantially of a number of gland boxes disposed adjacent to each other concentric to the plunger, and each comprising a flat-sided cavity concentric to the plunger, which houses a seal element arranged to press against the plunger by the effect of the pressure difference between its exterior and interior. The gland pack enables an effective seal to be formed by pressing against the plunger a number of seal elements spaced apart axially along the plunger. On the other hand, besides being able to form an effective seal along the plunger, the gland pack must also be such as to ensure a sufficient life for its own seal elements and for the plunger. In this respect, because of the pressure difference to which it is subjected, each seal element of the gland pack presses against the plunger with a certain pressure which, because of the friction due to the relative movement between the plunger and seal element, leads to a temperature increase and the possible rupture of the lubrication film. If these two phenomena exceed certain limits, they can lead to surface damage of the plunger which, besides causing the seal elements to wear rapidly, makes it necessary to recondition the plunger surface. This drawback is obviated by using materials of very long life for the plunger. In particular, plungers of the following materials are used:

compact sintered carbides, hereinafter called "solid" plungers;

steel coated with sintered carbides or other hard metals, hereinafter called "coated" plungers;

special surface-hardened steels, hereinafter called "hardened" plungers.

Now it is apparent that when the pressure concerned becomes high, of the order of 350 MPa (50,000 psi) and beyond, said seal and life problems of the gland pack become very critical, and in addition in this high pressure range or in the case of high compression ratios, the backflow phenomenon which occurs when the suction stage begins at the end of the delivery stage also becomes very important. This is because at that moment, the pressure in the cylinder falls suddenly to the suction pressure, and the fluid during compression had infiltrated into the interspace between the plunger and the gland boxes of the gland pack, is at a pressure considerably greater than the cylinder pressure, which if not controlled in its flow in the direction of the head, would lead to an explosive expansion of the seal elements, with their consequent deterioration or rupture.

Gland packs are already known from the prior art which ensure an effective seal, a good life and good behaviour with regard to backflow at high pressure. These known gland packs generally use, as the seal element housed in the flat-sided cavities of the gland boxes, a seal assembly consisting of pairs of metal seal rings in the form of combinations of internal rings, rings in the form of tangentially cut segments held together by a circumferential spring, and rings in the form of radially cut segments also held together by a circumferential spring, wherein the ring of the pair at the reciprocating machine head end comprises radial grooves in its surface on the head side, which have an anti-backflow function.

However, the use of all said known gland packs is limited due substantially to the fact that they use metal seal rings. This is because the high pressure which thrusts the metal seal rings against the plunger means that these gland packs can be effectively used only when the so-called "solid" plungers are used, but which are excessively fragile in use and are of high cost. In contrast, if said known gland packs are used with the so-called "coated" plungers or even less with the so-called "hardened" plungers, a satisfactory life cannot be obtained. Furthermore, with this latter type of plunger, the lubrication of the metal seal rings must be very accurate, and must therefore be done with lubricating oils having high lubrication characteristics, this precluding the use of said gland packs in particular applications such as the case of reciprocating compressors used in low density polyethylene production plants operating at high pressure, in which lubricating oils which are compatible with the treated fluid, and which can therefore be used, are all oils of low lubrication characteristics. The object of the present invention is to obviate the aforesaid drawbacks and to provide a gland pack for reciprocating machines operating at high pressure which, besides ensuring an effective seal, long life and excellent behaviour with regard to backflow, has such characteristics as to make it usable with all three of the aforementioned plunger types, i.e. "solid", "coated" or "hardened" plungers, and which also because of its antifriction properties enables the necessary quantity of lubricating oil fed to the seal elements to be reduced, and allows oils of low lubricity to be used provided they are compatible with the treated fluid, thus reducing the contamination of the fluid and making the gland pack usable even in those cases in which the compressed fluid possesses the characteristic of reducing the viscosity and lubricity properties of lubricating oils. This result is substantially attained by the fact that the high pressure fluid seal is formed along the plunger by pressing against it only the self-lubricating plastics rings. On the other hand, as these anti-friction plastics rings would not be able to alone support the very high stress due to the considerable pressure difference to which they are subjected both during compression and during suction (backflow phenomenon), each of them is supported by being coaxially enclosed between two metal anti-extrusion rings with a small radial gap between these latter and the plunger which traverses their bore, and which when they are immersed in a high pressure fluid, deform elastically to approach the plunger surface, but without pressing against it.

More specifically, according to one characteristic of the present invention, the gland pack for reciprocating machines operating at high pressure is constituted by a number of cylindrical gland boxes disposed adjoining each other concentric to the machine plunger and extending axially along said plunger from the head end to the crank mechanism end of said machine, said gland boxes each comprising a flat sided cavity concentric to the plunger and open towards it, in the first cavity or cavities at the head end there being housed a pressure breaking ring or rings, whereas in each of the subsequent cavities there is housed a seal assembly arranged to press a seal element against the plunger by the effect of the pressure difference between its exterior and interior, wherein said seal assembly is constituted by three flat sided rings adjoining each other along their adjacent flat sides, of which the central ring, enclosed coaxially between a first and a second metal anti-extrusion ring and constituting the seal element, is constructed of self-lubricating plastics material and is composed of a number of pseudotangentially cut segments held together by a circumferential spring, and said metal anti-extrusion ring situated at the head end of the cavity comprises radial grooves in its flat surface on the head side, the two said first and second metal anti-extrusion rings being sized such that there is a small radial gap between them and the plunger traversing their bore, and such as to deform elastically by reducing their diameter when subjected to a differential pressure between their exterior and interior, and thus approach the surface of the plunger but without ever pressing against it. According to a preferred embodiment of the invention, said central ring in the form of pseudotangentially cut segments of self-lubricating plastics material is made of filled polytetrafluoroethylene or polyimide resin, which by giving it high antifriction characteristics coupled with low hardness enable the quantity of lubricating oil to be fed to the seal elements, i.e. the rings, to be considerably reduced, and also allow oils of low lubricity to be used, and in addition ensure proper operation even under extreme working conditions by limiting friction with the plunger, reducing the danger of it becoming damaged even when using "coated" or "hardened" plungers, and consequently prolonging the life of the gland pack. According to a further characteristic of the present invention, said first and second metal anti-extrusion rings, which with said central ring in the form of pseudotangentially cut segments of self-lubricating plastics material form the set of three rings constituting a seal assembly, and which according to one aspect of the invention are sized such that a suitable radial gap is left between them and the plunger to an extend depending on their modulus of elasticity, so that when they are subjected to the differential pressure between their periphery and their interior, they resiliently approach the plunger but without ever pressing against it so as to avoid damaging it by virtue of their metal construction, their purpose in so doing being to prevent extrusion of said central plastics ring, can be constructed either in the form of a whole ring or in the form of a number of radially cut segments held together by a circumferential spring. In this latter case, the flat side of said anti-extrusion rings are made to adjoin the adjacent flat side of the central ring in the form of pseudotangentially cut segments, in such a manner that the edges of their radial cuts are offset with respect to the edges of the pseudotangential cuts of the central ring, so as to totally cover these latter cuts and vice versa. On the other hand, from experimental studies on reciprocating machines operating at high pressure it has been found that the variable part of the pressure between the suction and delivery pressures is mainly supported by the seal elements closest to the head, whereas the seal elements closest to the crank mechanism almost exclusively support the static part of the pressure present in the cylinder. From this, it can be deduced that the seals which are most stressed by the backflow phenomenon are those closest to the head, and thus the backflow phenomenon has practically no important or deleterious effect on the seal elements situated at the crank mechanism end. Consequently, the seal assemblies housed in the cavities of those gland boxes situated at the crank mechanism end and can be considerably simplified, and instead of comprising sets of three rings can comprise pairs of flat sided rings, in that there is no longer the need for a first metal anti-extrusion ring at the head end of the cavity to prevent extrusion of the central ring in the form of pseudotangentially cut segments of self-lubricating plastics material during backflow. On the other hand, the exclusion of said first metal anti-extrusion ring, which as stated is that which carries the radial grooves in its flat surface on the head side, necessarily means that the ring in the form of pseudotangentially cut segments of self-lubricating plastics material must be provided with radial grooves in its flat surface on its head side, in order to allow easy flow of fluid in the direction of the head during the suction stage, so as not to subject the ring to any substantial pressure difference which would be damaging for the ring.

In this respect, according to a further characteristic of the present invention, the seal assembly housed in the cavities of gland boxes situated at the crank mechanism end of the reciprocating machine is constituted by a pair of flat sided rings which adjoin each other along their adjacent flat sides, of which the first ring, situated at the head end of the cavity and constituting the seal element, is constructed of self-lubricating plastics material and is composed of a number of pseudotangentially cut segments held together by a circumferential spring and comprising radial grooves in its flat surface on its head side, whereas the second ring of the pair, which is situated at the crank mechanism end of the cavity, is a metal anti-extrusion ring sized such as to leave a small radial gap between it and the plunger which traverses its bore, and such as to deform elastically by reducing its diameter when subjected to a pressure difference between its exterior and interior, and thus approach the plunger surface but without ever pressing against it.

Finally, according to further characteristics of the invention, said ring in the form of pseudotangentially cut segments of self-lubricating plastics material used in the pair of rings constituting the seal assembly to be housed in the cavities of those gland boxes situated at the crank mechanism end of the reciprocating machine, is substantially analogous to said central ring in the form of pseudotangentially cut segments of plastics material of said set of three rings which make up the seal assembly to be housed in the cavities of those gland boxes situated at the head end of the reciprocating machine, with the exception of the presence of radial grooves in its flat surface on the head side, and consequently, as in the case of this latter, can be constructed of polyimide resin or polytetrafluoroethylene, whereas said metal anti-extrusion ring of the pair of rings is perfectly equal to the metal anti-extrusion rings of said sets of three rings, and thus can be in the form either of a whole metal ring or a number of radially cut metal segments held together by a circumferential spring.

The invention will be more apparent with reference to the accompanying drawings which illustrate a preferred embodiment thereof given by way of non-limiting example, in that technical or constructional modifications can be made thereto without leaving the scope of the present invention.

In said drawings:

FIG. 2 is a partial longitudinal section to an enlarged scale through a part of the cylinder comprising a seal assembly constituted by a set of three flat sided rings, used in the gland pack of FIG. 1;

FIG. 3 is a partial longitudinal section to an enlarged scale through a part of the cylinder comprising a seal assembly constituted by a pair of flat sided rings, which is also used in the gland pack of FIG. 1;

Figure 1:
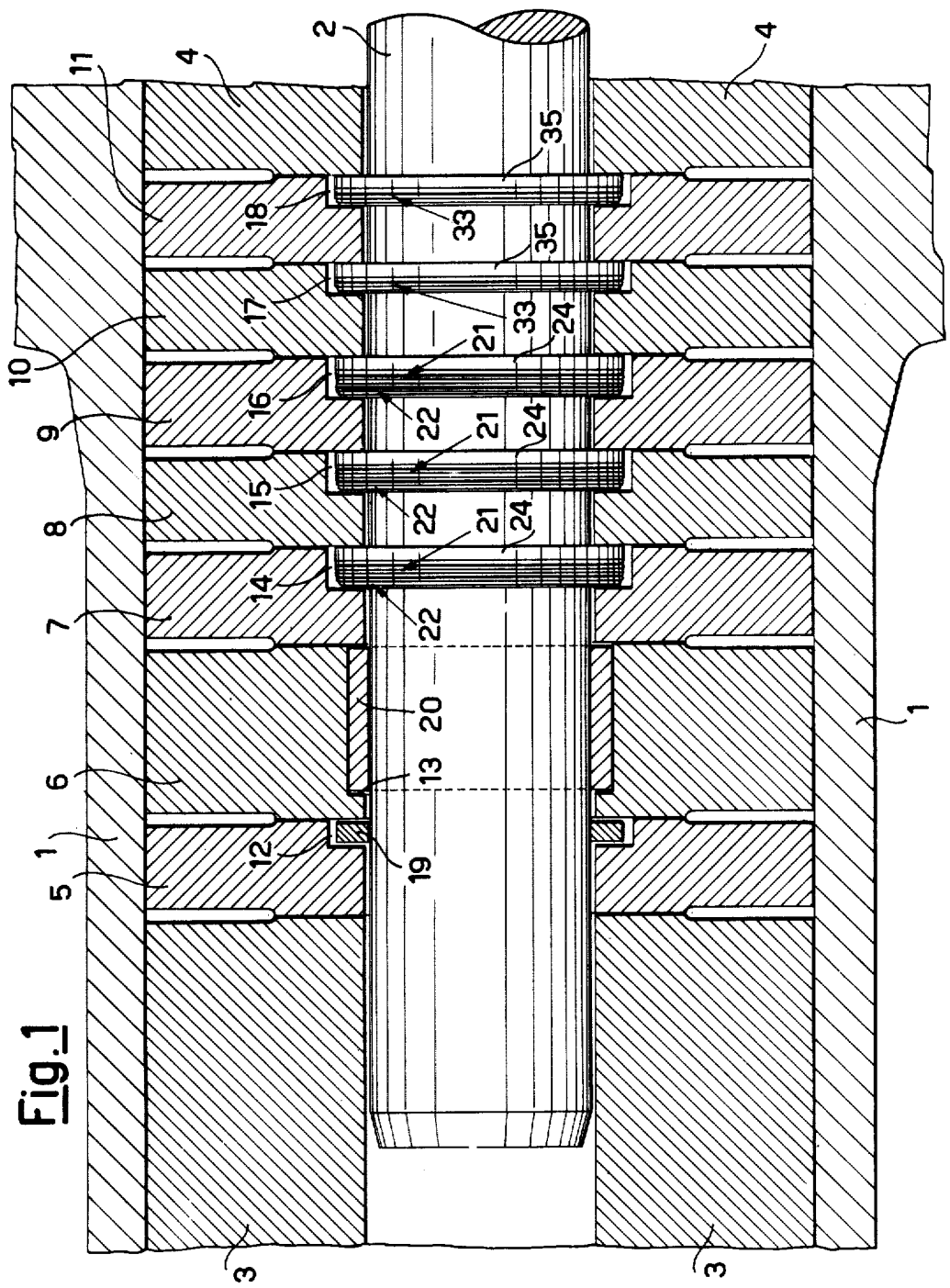
FIG. 1 is a partial fragmentary longitudinal section through the cylinder of a reciprocating machine operating at high pressure, in which a plunger moves with reciprocating motion, the seal along the plunger being formed by a gland pack according to the invention.

With reference to the figures and specifically FIG. 1, the reference numeral 1 indicates the sleeve of a cylinder of a reciprocating machine operating at high pressure, and 2 the cylindrical plunger which moves with reciprocating motion inside said cylinder from right (crank mechanism end) to left (head end) during the compression stage and from left to right during the suction stage respectively, as shown in FIG. 1. In an internal cavity in the member 1, bounded at the head end by the cylindrical shoulder 3 and at the crank mechanism end by the cylindrical shoulder 4, there is inserted a gland pack constituted by a number of adjoining gland boxes concentric to the plunger 2 and extending axially along said plunger, said gland boxes, which are seven in number in the embodiment illustrated, being indicated respectively by the reference numerals 5, 6, 7, 8, 9, 10 and 11 from the head end (left hand end) to the crank mechanism end (right hand end) of FIG. 1. Each gland box 5-11 comprises at its crank mechanism end, i.e. at its right hand end, a flat sided cavity 12, 13, 14, 15, 16, 17 and 18 respectively, open towards the plunger 3 and bounded at the crank mechanism end by the wall and at the head end by the next gland box, going from head end to the crank mechanism end. In the first cavity at the head end, i.e. in the cavity 12 of the gland box 5, there is housed a pressure breaking ring 19, the purpose of which, rather than to provide an effective seal, is to dampen the pressure and suction wave to which the various seal elements are subjected during the compression stage and suction stage respectively. As the ring 9 is not a main subject matter of the invention, it will not be described in detail in this text.

In the cavity 13 of the next gland box 6 there is housed a guide bush of antifriction metal 20, the purpose of which is to slidably support the plunger 2 during its reciprocating motion.

Figure 5:
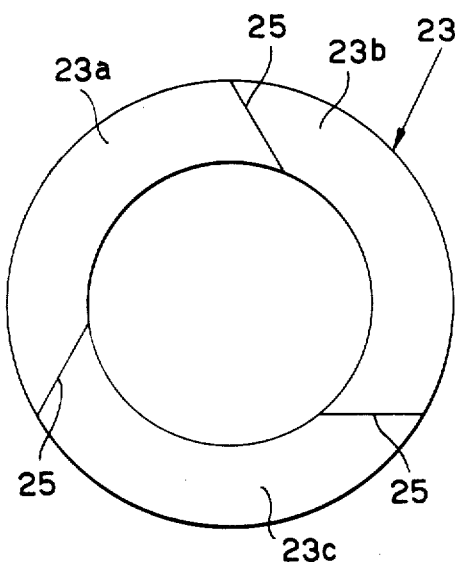
FIG. 5 is a front view to an enlarged scale of the central self-lubricating plastics ring of the seal assembly comprising three rings according to the invention, said view being taken on the line B—B of FIG. 2.

In the next three cavities 14, 15 and 16 of the next gland boxes 7, 8 and 9 situated at the head end of the gland pack, there are housed the seal assemblies 21 which, according to one characteristic of the present invention, are constituted by three flat sided rings 22, 23 and 24 which adjoin each other on their adjacent flat sides (see specifically FIG. 2). The central ring 23 of said three, which represents the actual seal element and is the only ring which becomes pressed against the peripheral surface of the plunger by the pressure difference between its interior and exterior, is composed of a number of segments, namely three in the figure, these being indicated respectively by 23a, 23b and 23c (see specifically FIG. 5), which are in contact with each other and are slidable one on the other along pseudotangential cuts 25, and are held together by a circumferential spring 26 housed in a groove 27 present in the outer surface of the segments (see FIG. 2), and are constructed of a self-lubricating plastics material, namely filled polytetrafluoroethylene or filled polyimide resins.

The first ring 22 of the three, i.e. the ring situated at the head end of the cavity, i.e. at the left hand end of the cavity in FIGS. 1 and 2, and the second ring 24 of the three, i.e. the ring situated at the crank mechanism end of the cavity, i.e. at the right hand end of the cavity in FIGS. 1 and 2, are instead in the form of metal anti-extrusion rings sized to provide a suitable radial gap 28 (see FIG. 2) between them and the plunger 2 such that when they are subjected to the pressure difference between their periphery and interior they deform by reducing their diameter, and resiliently approach the plunger but without ever pressing against it so as not to damage it, which could otherwise happen because they are of metal, but instead in order to prevent extrusion of the central pseudotangentially cut ring 23 which, being of plastics material, would not have sufficient strength in this sense.

In addition, said first ring 22 is provided in its flat surface on the head side, i.e. on its left hand side in FIGS. 1 and 2, with radial grooves 29.

Figure 4:
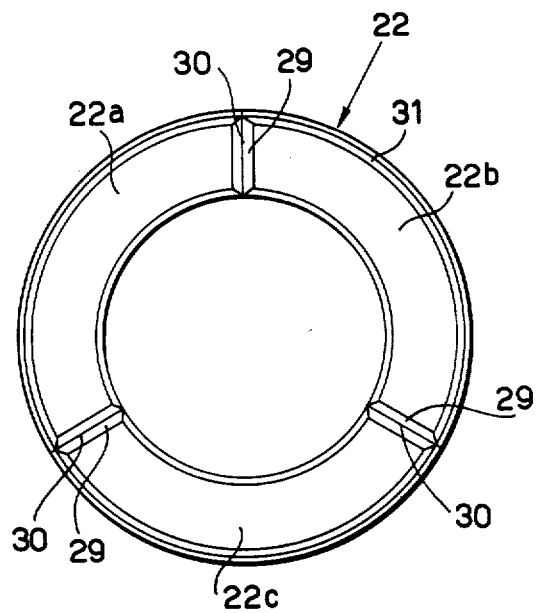
FIG. 4 is a front view to an enlarged scale, taken from the head end, of the first metal anti-extrusion ring of the seal assembly comprising three rings according to the invention, said view being taken on the line A—A of FIG. 2.

Said first metal anti-extrusion ring 22 is shown in the figures as constituted by a number of metal segments, namely the three metal segments 22a, 22b and 22c (see specifically FIG. 4), which are in contact along radial cuts 30 and are held together by a circumferential spring 31 housed in a groove 32 (see FIG. 2) present in the outer surface of the segments, but it can also be in the form of a whole ring. Instead of being provided at the radial cuts 30 of the metal anti-extrusion ring 22 as shown in FIG. 4, the radial grooves 29 can be provided in any other position in the flat surface on the head side of the ring 22. In addition, the use of such a metal anti-extrusion ring 22 with radially cut segments means that said ring must be placed in contact with said pseudotangentially cut central plastics ring 23 always in such a manner that the edges of its radial cuts 30 never correspond with the edges of the pseudotangential cuts 25 of said central ring 23, so that the edges of said cuts 30 and 25 are completely covered by parts of the adjacent flat sides of the two said rings which do not comprise cuts.

Figure 6:
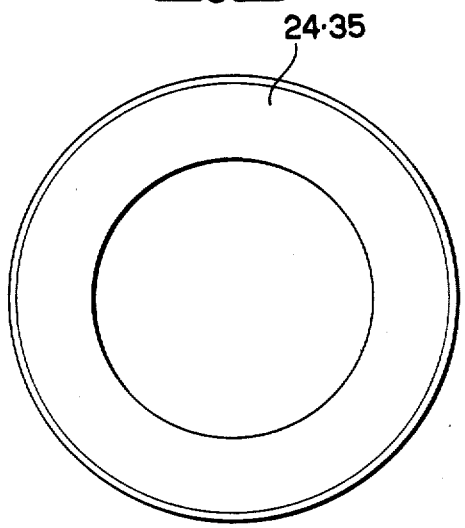
FIG. 6 is a front view to an enlarged scale of the second metal anti-extrusion ring of the seal assembly comprising three rings according to the invention, said view being taken on the line C—C of FIG. 2 and being perfectly analogous to that taken on the line D—D of FIG. 3.
Figure 7:
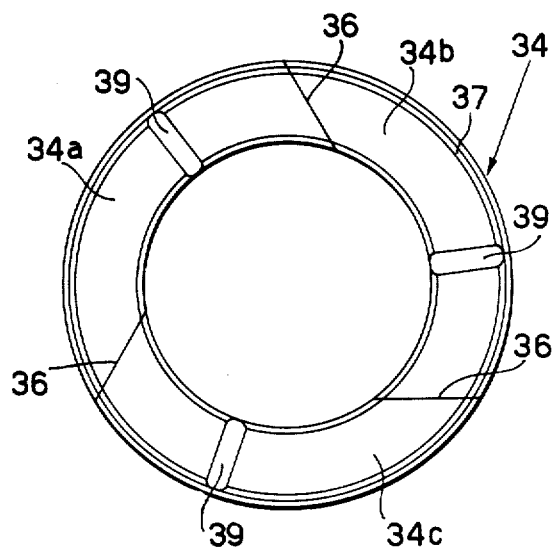
FIG. 7 is a front view to an enlarged scale, taken from the head end, of the self-lubricating plastics ring of the seal assembly comprising a pair of rings according to the invention, said view being taken on the line E—E of FIG. 3.

Likewise, said second metal anti-extrusion ring 24 of the three rings forming a seal assembly 21, which in the figures is shown as a whole metal ring (see specifically FIG. 6), can be also constructed in the form of radially cut segments as in the case of said first metal anti-extrusion ring 22. Finally, in the other two cavities 17 and 18 of the next gland boxes 10 and 11 situated at the crank mechanism end of the gland pack, there are housed the seal assemblies 33 which, according to a further characteristic of the present invention, are constituted by a pair of flat sided rings 34 and 35 respectively, adjoining each other along their adjacent flat surfaces (see specifically FIG. 3). The ring 34, which is situated at the head end of the cavity, i.e. at the left hand end of the cavity in FIGS. 1 and 3, and which represents the actual seal element, and the only ring which is pressed against the peripheral surface of the plunger 2 by the pressure difference between its exterior and its interior, is substantially similar to the said central ring 23 of the three rings constituting a seal assembly 21, and is thus composed of a number of segments, namely three in the figure, and indicated respectively by 34a, 34b and 34c (see specifically FIG. 7), which are in contact with each other and slidable one on the other along pseudotangential cuts 36, and are held together by a circumferential spring 37 housed in a groove 38 provided in the outer surface of the segments (see FIG. 3), and are constructed of a self-lubricating plastics material, namely filled polytetrafluoroethylene or filled polyimide resins. Moreover, said pseudotangentially cut plastics ring 34 in the form of segments is provided in its flat surface on the head side, i.e. on the left hand side in FIGS. 1 and 3, with radial grooves 39.

The other ring 35 of the pair is completely equal to the said second metal anti-extrusion ring 24 of the three rings which constitute a seal assembly 21, and can thus be in the form either of a whole metal ring as shown in the figures (see specifically FIG. 6), or in the form of radially cut segments. In this latter case, the metal anti-extrusion ring 35 must be disposed in contact with said pseudotangentially cut plastics ring 34 in the form of segments such that the edges of its radial cuts never correspond with the edges of the pseudotangential cuts 36 of said ring 34.

The behaviour of the gland pack according to the invention, and the advantages obtained by it are now immediately apparent. During the compression stage, the plunger 2 moves from right to left relative to FIG. 1, and thus compresses the fluid previously drawn into the cylinder. Because of its pressure, this fluid tends to leak along the periphery of the plunger in the direction of the crank mechanism end, i.e. towards the right. During its path, the fluid firstly encounters the pressure breaking ring 19 housed in the cavity 12 of the first gland box 5 at the head end of the gland pack, but as said ring is designed in order to provide only a limited resistance to the passage of the fluid, this latter arrives upstream of the first seal assembly 21 housed in the cavity 14 of the gland box 7 practically at a pressure which is only slightly less than the pressure in the compression chamber of the reciprocating machine. The entire pressure of the fluid then infiltrates into the radial gap (see FIG. 2) at the plunger 2 of the metal anti-extrusion ring 22, and by way of the radial grooves 29 in this latter reaches the top of the cavity 14. By virtue of this, the rings 22, 23 and 24 forming the seal assembly 21 become pressed axially the one against the other and the last against the flat wall at the head end of the next gland box 8, so providing a radial seal. Moreover, although the ring 22 does not undergo appreciable deformation as it is subjected to only a small pressure difference between its interior and its exterior due to the fact that the pressure in said radial gap 28 is nearly equal to the pressure in the top part of the cavity 14, the other two rings 23 and 24 are instead subjected to a considerable pressure difference as the central ring in the form of pseudotangentially cut segments 23 is already in contact with the surface of the plunger 2 by virtue of its circumferential spring 26, and therefore provides practically no appreciable radial gap through which the fluid can infiltrate.

Said self-lubricating plastics ring 23 is then practically pressed against the surface of the plunger 2 by the considerable pressure existing in the top of the cavity 14, and thus provides an effective axial seal. The other metal anti-extrusion ring 24 becomes deformed, so reducing its diameter and thus the radial gap which it forms with the plunger 2, but because of its construction only comes to rest resiliently on the lateral surface of said plunger but without pressing against it. It therefore prevents any extrusion of the central plastics ring 23 while at the same time not damaging the plunger 2 in any way.

The fluid which manages to pass said first seal assembly 21 encounters the subsequent assemblies, which, although subjected to increasingly smaller pressures, behave in a similar manner to the first, so that the fluid leakages along the plunger become relentlessly and effectively blocked during the compression stage.

During the suction stage, in which the pressure in the cylinder falls suddenly to the suction pressure following the movement of the plunger 2 from the left to the right of FIG. 1, the condition is created in which the fluid, which during compression had infiltrated into the space between the plunger and gland boxes, is now at a pressure greater than the pressure in the cylinder, and therefore tends to flow back in the direction of the head, i.e. towards the left of FIG. 1 (backflow). If this fluid flow towards the head were opposed, it would subject the rings of the seal assemblies to a differential pressure which would cause their explosive expansion, but instead this flow is allowed by the fact that the seal assemblies 21 and 33 are pressed axially towards the left of FIG. 2 by the greater pressure existing downstream, i.e. at the crank mechanism end, of said seal assemblies, and thus a radial gap is created between the walls of the gland boxes and the rings 24 and 35 respectively, and the fluid can flow back towards the head through this and through the radial grooves 29 and 39 in the rings 22 and 34 respectively. In the seal assemblies 21, which are those subject to the greatest pressure by the backflowing fluid, the two metal anti-extrusion rings 22 and 24 exchange their function, and thus the metal ring 22 deforms elastically, without pressing against the lateral surface of the plunger 2 and thus prevents any extrusion of the central plastics ring 23.

From the foregoing, it is apparent that the gland pack according to the invention not only ensures effective seal against high pressure during the compression stage and an excellent behaviour with regard to backflow, but in addition because of the fact that only rings of self-lubricating plastics material (23 and 34) are pressed against the plunger 2, it enables "coated" or "hardened" plungers to be used, in addition to "solid" plungers, and also allows the necessary quantity of lubricating oil to be fed to the seal assemblies 21 and 33 to be substantially reduced, and enables low lubricity lubricating oils to be used provided they are compatible with the treated fluid, without prejudicing the life, which remains long both for the gland pack and for the plunger.

We claim:

1. A gland pack for reciprocating machines operating at high pressure, constituted by a number of cylindrical gland boxes disposed adjoining each other concentric to the machine plunger and extending axially along said plunger from the head end to the crank mechanism end of said machine, said gland boxes each comprising a flat sided cavity concentric to the plunger and open towards it, in the first cavity or cavities at the head end there being housed a pressure breaking ring or rings, whereas in each of the subsequent cavities there is housed a seal assembly arranged to press a seal element against the plunger by the effect of the pressure difference between its exterior and interior, wherein said seal assembly is constituted by three flat sided rings adjoining each other along their adjacent flat sides, of which the central ring, enclosed coaxially between a first and a second metal anti-extrusion ring and constituting the seal element, is constructed of self-lubricating plastics material and is composed of a number of pseudotangentially cut segments held together by a circumferential spring, and said first metal anti-extrusion ring situated at the head end of the cavity comprises radial grooves in its flat surface on the head side, the said two first and second metal anti-extrusion rings being sized such that there is a small radial gap between them and the plunger traversing their bore, and such as to deform elastically by reducing their diameter when subjected to a differential pressure between their exterior and interior, and thus approach the surface of the plunger but without ever pressing against it.

2. A gland pack as claimed in claim 1, wherein said central ring of self-lubricating plastics material is constituted by a number of pseudotangentially cut segments held together by a circumferential spring and constructed of filled polytetrafluoroethylene.

3. A gland pack as claimed in claim 1, wherein said central ring of self-lubricating plastics material is constituted by a number of pseudotangentially cut segments held together by a circumferential spring and constructed of filled polyimide resins.

4. A gland pack as claimed in claim 1, wherein said first radially grooved metal anti-extrusion ring situated at the head end of the cavity is constituted by a whole metal ring.

5. A gland pack as claimed in claim 1, wherein said first radially grooved metal anti-extrusion ring situated at the head end of the cavity is constituted by a number of radially cut metal segments held together by a circumferential spring, said first metal ring being in contact with said central ring in the form of pseudotangentially cut segments, by way of uncut portions of its adjacent flat side which cover the edges of the pseudotangential cuts of said central ring and vice versa.

6. A gland pack as claimed in claim 1, wherein the other or second metal anti-extrusion ring of the three, which is situated at the crank mechanism end of the cavity, is constituted by a whole metal ring.

7. A gland pack as claimed in claim 1, wherein the other or second said metal anti-extrusion ring of the three, which is situated at the crank mechanism end of the cavity, is constituted by a number of radially cut metal segments held together by a circumferential spring, said second metal ring being in contact with said central ring in the form of pseudotangentially cut segments, by way of uncut portions of its adjacent flat side which cover the edges of the pseudotangential cuts of said central ring and vice versa.

8. A gland pack as claimed in claim 1, wherein the seal assembly housed in the cavities of those gland boxes situated at the crank mechanism end is constituted by a pair of flat sided rings which adjoin each other along their adjacent flat sides, of which the first ring, situated at the head end of the cavity and constituting the seal element, is constructed of self-lubricating plastics material and is composed of a number of pseudotangentially cut segments held together by a circumferential spring, and comprises radial grooves in its flat surface on the head side, whereas the second ring of the pair, which is situated at the crank mechanism end of the cavity, is a metal anti-extrusion ring sized such as to provide a small radial gap between it and the plunger which traverses its bore, and to elastically deform by reducing its diameter when subjected to a differential pressure between its exterior and its interior, and thus approach the surface of the plunger but without ever pushing against it.

9. A gland pack as claimed in claim 8, wherein said ring of self-lubricating plastics material is constituted by a number of pseudotangentially cut segments held together by a circumferential spring and provided with radial grooves in their flat surfaces on the head side, and constructed of filled polytetrafluoroethylene.

10. A gland pack as claimed in claim 8, wherein said ring of self-lubricating plastics material is constituted by a number of pseudotangentially cut segments held together by a circumferential spring and provided with radial grooves in their flat surfaces on the head side, and constructed of filled polyimide resins.

11. A gland pack as claimed in claim 8, wherein said metal anti-extrusion ring situated at the crank mechanism end of the cavity is constituted by a whole metal ring.

12. A gland pack as claimed in claim 8, wherein said metal anti-extrusion ring situated at the crank mechanism end of the cavity is constituted by a number of radially cut metal segments held together by a circumferential spring, said metal ring being in contact with said ring in the form of pseudotangentially cut segments of self-lubricating plastics material by way of uncut portions of its adjacent flat side, which cover the edges of the pseudotangential cuts of said ring of plastics material and vice versa.

13. An improved gland pack for reciprocating machines operating at high pressure, comprising three seal assemblies of three flat sided rings as claimed in claim 1, housed in the cavities of three successive gland boxes situated at the head end of the machine, and two seal assemblies in the form of pairs of flat sided rings, as claimed in claim 8, housed in the cavities of two successive gland boxes situated at the crank mechanism end of the machine.

* * * * *